United States Patent
Schulte

[15] 3,653,874
[45] Apr. 4, 1972

[54] PRODUCTION OF METAL PELLETS FROM METALLIC OXIDES

[72] Inventor: Elwood V. Schulte, Pittsburgh, Pa.

[73] Assignee: Koppers Company, Inc.

[22] Filed: Jan. 2, 1970

[21] Appl. No.: 246

[52] U.S. Cl. .................................................75/3
[51] Int. Cl. .................................................C21b 1/24
[58] Field of Search .....................................75/3

[56] References Cited

UNITED STATES PATENTS

| | | | |
|---|---|---|---|
| 2,844,457 | 7/1958 | Amberg | 75/3 |
| 3,169,054 | 2/1965 | Werner | 75/3 |
| 2,864,686 | 12/1958 | Agarwal | 75/3 |
| 3,328,161 | 6/1967 | Rausch et al. | 75/33 |
| 1,848,710 | 3/1932 | Gustafsson | 75/3 X |
| 2,996,372 | 8/1961 | Imperato, Jr. | 75/3 |

*Primary Examiner*—Allen B. Curtis
*Attorney*—James E. Armstrong, III, Oscar B. Brumback and Olin E. Williams

[57] ABSTRACT

A process and apparatus for producing pellets of iron from finely divided iron oxide materials is provided in which the process includes: (1) admixing the finely divided iron oxide materials with alkaline earth metal oxides or hydroxides; (2) forming pellets of the admixture; (3) simultaneously drying and carbonating the pellets; and, (4) reducing the iron oxide materials to iron. Moreover, to produce steel from the finely divided iron oxide materials, the reduced pellets are immediately charged into a conventional steelmaking furnace.

10 Claims, 4 Drawing Figures

FIG. 1

INVENTOR.
ELWOOD V. SCHULTE

FIG. 2

INVENTOR.
ELWOOD V. SCHULTE

FIG. 3

INVENTOR.
ELWOOD V. SCHULTE

PRODUCTION OF METAL PELLETS FROM METALLIC OXIDES

BACKGROUND OF THE INVENTION

1. Field of the Invention

This invention relates to pellets of iron and to methods of producing them from finely divided iron oxide materials. The invention is particularly useful in the production of iron pellets from finely divided iron ores, blast furnace flue dust, and other sources of iron and iron compounds which are commonly available. More particularly this invention relates to steel and methods of producing steel from finely divided iron oxide materials.

Conventionally iron is produced in a blast furnace from iron ores. As is well known, the blast furnace is a complex shaft furnace arrangement into which iron ore, coke, limestone and the like are charged into the top of the furnace and from which liquid iron and slag are tapped at the bottom at intervals of a few hours. Preheated air is introduced into the lower part of the furnace through tuyeres to react with the coke to form carbon monoxide. The carbon monoxide gas reduces the iron ore to iron, and the iron having been freed from the iron ore is melted by the heat of the chemical reaction of coke burning with air.

Conventionally the molten iron produced by the blast furnace is charged into a conventional steelmaking furnace such as, for example, an electric furnace, an open-hearth furnace, a basic oxygen furnace, and the like. Various constituents such as, for example, fluxes, alloying additions, and the like, are added to the molten bath to provide the desired steel composition. The steelmaking furnace is operated conventionally to produce molten steel.

To successfully operate a blast furnace, good quality coke of a uniform lump size and good quality iron ore of a uniform lump size are required. But high quality lump iron ores are becoming scarce as natural resources are gradually being depleted. Consequently, the use of finely divided materials containing iron oxides such as, for example, blast furnace flue dust, scale and the like, and low grade iron ores, such as the taconites, which taconites must be beneficiated, is increasing.

To render the finely divided ores and dusts usable in a blast furnace or a conventional steelmaking furnace, it has heretofore been the practice to sinter, pelletize, or nodulize the powdery materials by heating the powdery materials to a high temperature to effect lumping or to bond the powdery materials together with a binding material. These pellets, may then be charged into the blast furnace or the steel-making furnace to perform their metallurgical functions.

2. Description of Prior Art

Several methods of agglomerating pellets from finely divided materials are known. A typical method comprises the steps of crushing and grinding taconite ores to a finely divided state. The iron oxide in the taconites is in several forms — predominately, magnetite ($Fe_3O_4$) which is to some degree magnetic. The finely divided taconite is passed over a magnetic field with the consequent recovery of an oxide containing about 62 to 69 percent iron. The beneficiated ore is then formed into pellets of any desired size and shape in a balling drum or pellitizer; but, the predominate shape of the pellets is spherical having a diameter of about three-eighths of an inch. These pellets, referred to as "green pellets", contain quantities of water which have been added for the agglomeration of the particles previously described.

The green pellets are, hence, relatively soft and weak; and, thus, it is necessary to harden the pellets to give them sufficient strength for handling, shipping, storage, and use in metallurgical furnaces.

The green pellets may be heat hardened, or sintered by which the pellets are subjected to temperatures of about 2,000° F. or greater to evaporate the water used in the agglomeration of the pellets and to bring about sintering or melting of the ore particles in the pellets. Various apparatus for indurating pellets include a vertical shaft furnace or a horizontal furnace having movable grates therein.

A major disadvantage of sintering is that the total surface area of the pellets is reduced; consequently, greater volumes of reducing gases as well as longer times to achieve satisfactory reduction of the iron oxides is required with sintered pellets.

Another method of forming hard crush-resistant pellets is to admix finely divided iron oxides with at least one of the groups consisting of the oxides and hydroxides of alkaline earth metals and, subsequently, reacting the resulting mixture with carbon dioxide in the presence of up to about 10 percent moisture in the admixture, as taught in U.S. Pat. No. 2,844,457. The finely divided metal-containing material is mixed with an oxide or hydroxide of calcium, magnesium, or both in the presence of about 10 percent moisture and subsequently the admixture is formed into lumps by any conventional method, such as pressing, extrusion, vibrating, molding, or pelletizing. The formed lumps are then treated with carbonic acid gas (carbon dioxide) in the presence of up to about 10 percent moisture in the admixture whereby a hard crush-resistant pellet is formed. After these pellets have been formed they are then available for shipment to a steel-making facility to be charged into a blast furnace for the reduction of the iron oxides contained therein.

Several methods of direct reduction without using a blast furnace are well known. Gaseous reduction of pellets with carbon monoxide and hydrogen at temperatures of 1,300°–1,800° F., and preferably 1,500°–1,800° F. in a reduction zone of a shaft furnace, is taught in U.S. Pat. No. 3,375,098 in which the product gases of carbon dioxide and water vapor are regenerated and enriched with methane to produce carbon monoxide and hydrogen, for recirculation into the reduction zone. The reduced pellets may subsequently be used in a steelmaking furnace.

Another method of direct reduction without using a blast furnace is taught in U.S. Pat. No. 3,369,888 in which a conventional open-topped shaft furnace is divided into five zones including in succession from top to bottom, an indurating zone, a cooling zone, an isobaric or a stagnant zone, a reducing zone, and a cooling zone. Green pellets of iron ore, having been agglomerated only with water, are charged into the top of the furnace and enter the indurating zone. Gas and air from an external source is introduced at the bottom of the indurating zone for heating the pellets to drive off their moisture content to the point of incipient sintering, which is generally in a temperature range of 1,600° to 2,400° F. The pellets are cooled by passing downwardly into the cooling zone whereby sticking of the pellets together is prevented. The pellets now having been hardened by forming metal to metal bonds therein by the use of heating, pass through the isobaric or stagnant zone, whose purpose is to prevent the flow of gases in the furnace from the cooling zone to the reducing zone, and vice versa, the flow of gases from the reducing zone to the cooling zone. The delicate balance between the cooling and reducing zone is maintained by differential pressure regulators which may actuate vacuum lines situated at the top of the reducing zone in the furnace. The pellets are subsequently reduced in the reducing zone by hot reducing gases that enter the shaft furnace at the bottom of the reducing zone from external sources. The hot reducing gases, comprising predominately carbon monoxide and hydrogen, heat the pellets and reduce their iron oxide content. Subsequently, the pellets are cooled in the cooling zone with recirculated cooling gases and are discharged from the bottom of the furnace.

This method of U.S. Pat. No. 3,369,888 has several disadvantages primarily because of its waste of fuel and valuable gases. The pellets passing through the furnace are heated, cooled, reheated, and recooled rather than heated once and then finally cooled. The furnace is open-topped, thus expelling valuable gases into the atmosphere. Moreover, care must be used to prevent air from entering through the top of the furnace and mixing with the gases in the indurating zone because of the dangers of an explosion by the reaction of oxygen with carbon monoxide and/or other gaseous reactions which would upset the chemical reactions essential for the success of such method. The furnace is unduly complex, as delicate controls are necessary to prevent the flow of gases through the stagnant zone. If the reducing gases, predominately carbon monoxide and hydrogen passed into the cooling zone from the reducing zone, they would react exothermically with the air entering the cooling zone to heat the pellets in the cooling zone, thereby defeating the purpose of the cooling zone. If, on the other hand, air from the cooling zone entered the reducing zone of the furnace, combustion of the hot reducing gases would occur, thereby depriving the reducing gases from their primary function of reducing the iron oxides in the pellets.

Thus the prior art illustrates methods for forming pellets, methods for hardening pellets, methods for reducing pellets, and methods for heat hardening and reducing pellets in one furnace. On the other hand, the present invention involves carbonate-hardening and reducing of pellets where the by-product gases of reduction are used to harden the pellets, and preferably, such carbonate-hardening and reducing of pellets in the present invention is achieved in a single unit. Moreover, the hardened and reduced pellets of the present invention may be immediately charged into a steelmaking furnace whose by-product waste gases are used for hardening the pellets.

SUMMARY OF THE INVENTION

In accordance with the invention, finely divided iron oxide materials are admixed with alkaline earth metal oxides or hydroxides, such as, for example, calcium hydroxide, magnesium hydroxide, and the like in the presence of 7–20 percent moisture by weight. Pellets are formed from this admixture by conventional methods such as, for example, in a balling mill or in a pelletizer. The pellets are partially dried and partially carbonated in a pellet dryer in one embodiment of the invention by being contacted with carbon dioxide. Subsequently, the pellets are charged into a carbonator and reacted with additional amounts of carbon dioxide at elevated temperatures where at least a major portion of the alkaline earth metal oxides or hydroxides are converted to their corresponding carbonates. Consequently, a carbonate-bonded pellet is formed wherein the individual and discrete particles of the metallic oxide materials are bonded together in lieu of the water bonding achieved in the agglomeration of the finely divided iron oxides. Alternatively in another embodiment of the invention, the pellets may be dried and carbonated simultaneously in a single step.

The carbonated-bonded pellets are then reduced with hot reducing gases in a reduction zone at temperatures of at least 1,300° F. Preferably, a gaseous mixture of carbon monoxide and hydrogen reduces the iron oxides to iron whereby the gas by-products of carbon dioxide and water vapor are produced. The carbon dioxide produced from the reduction of the pellets are used to carbonate additional pellets previously mentioned.

The reduced pellets have a crushing strength of about 30 to 300 pounds and are hence suitable for consumption in an electric steelmaking furnace or the like.

The pellets after having been reduced may be charged immediately into a metallurgical steelmaking furnace without cooling, such as, for example, a basic oxygen furnace, along with other ingredients such as alloying elements, carbon, and fluxes for the production of steel. The basic oxygen furnace is operated conventionally and the waste gases of the basic oxygen furnace, comprising carbon monoxide, may be recirculated to reduce pellets previously mentioned.

If desired, calcium hydroxide may be produced by charging raw limestone into a calcinator or lime kiln located adjacent to the operating equipment for producing the carbonate-bonded and reduced pellets previously described. Consequently, lime is withdrawn from the calcinator and charged into a hydrator to produce calcium hydroxide. This calcium hydroxide may be admixed with the finely divided materials previously described. During the calcinating of raw limestone carbon dioxide is evolved in the calcinator. The carbon dioxide evolved in the calcinator may be circulated to carbonate the pellets according to the previously described methods.

DETAILED DESCRIPTION

Figure 2:
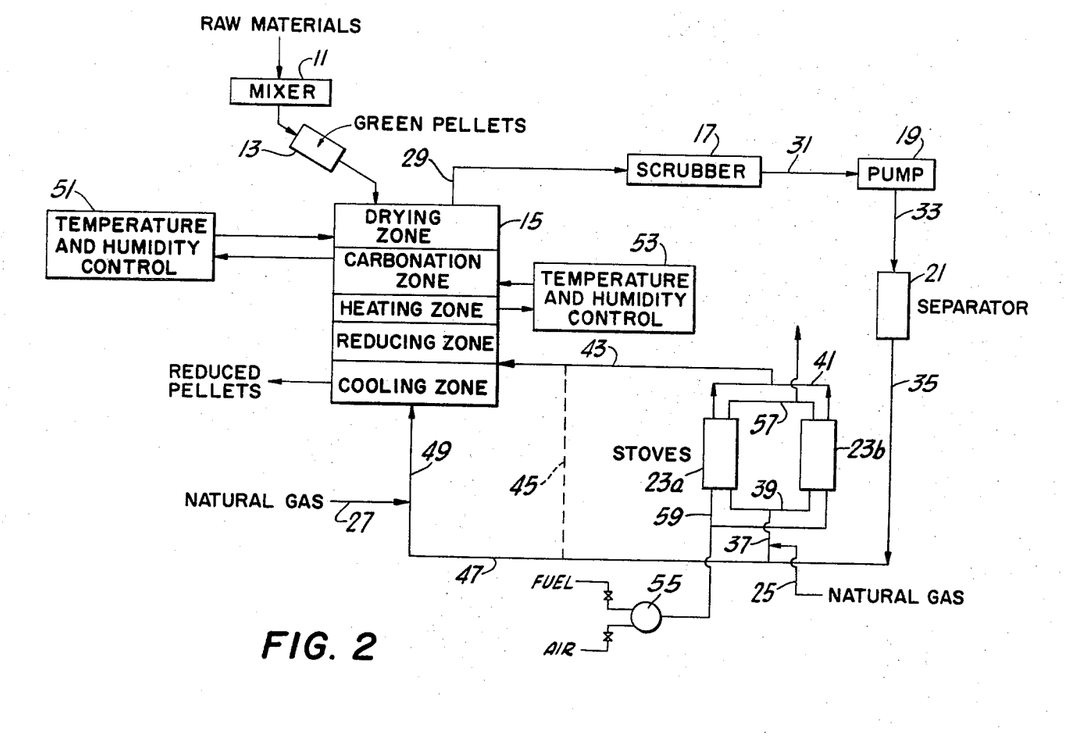
FIG. 2 illustrates an embodiment of a system for producing pellets of a iron from finely divided iron oxide materials according to the methods of FIG. 1.

In FIG. 2, an embodiment of a system for producing pellets of iron comprises a mixer 11, a balling drum or a pelletizer 13 for producing pellets, and a vertical elongated shaft furnace 15 having associated equipment for the treatment of gases leaving the shaft furnace.

Figure 1:
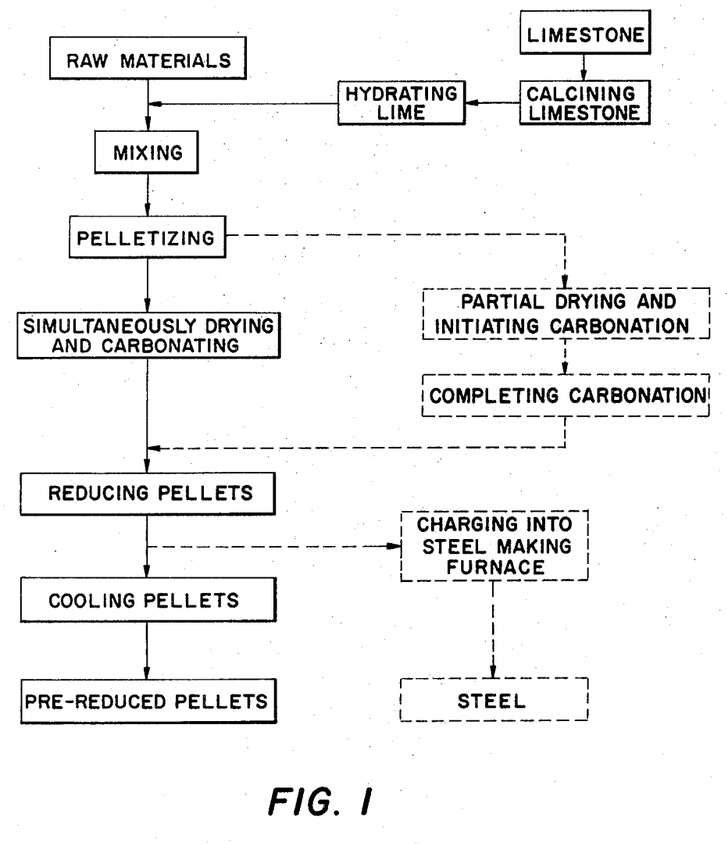
FIG. 1 illustrates a flow diagram of the methods of the invention.

In a preferred embodiment of the invention in FIGS. 1 and 2, raw materials are charged into a conventional mixer 11 and thoroughly blended together to achieve a homogenous mass. The raw materials include (a) iron ores and/or iron oxide concentrates, (b) at least one of the groups consisting of oxides and hydroxides of an alkaline earth metal, (c) water, (d) a catalyst, if desired, and (e) other additives, if desired.

The iron ores may include those from the taconites having about 60 percent iron oxide therein in the form of magnetite ($Fe_3O_4$). Other iron ores may be used, however, containing amounts of hematite ($Fe_3O_4$). Other iron ores may be used, however, containing amounts of hematite ($Fe_2O_3$) and of FeO. Iron oxide concentrates may be used, such as, for example, blast furnace flue dust, scale, and the like. The particle size of the iron ores or iron oxide concentrates should be in the range of 75 percent by weight passing through a 325 mesh screen size or less. This particle size range has been found to be the preferred range for forming "green" pellets that have a "green" strength sufficient for subsequent operations to which the "green" pellets are subjected.

The alkaline earth metal oxides or hydroxides that may be used, in accordance with the invention, include calcium oxide, calcium hydroxide, magnesium oxide, magnesium hydroxides, and mixtures thereof.

Preferably a hydroxide of an alkaline earth metal is used, such as, for example, calcium hydroxide ($Ca(OH)_2$); the amount of calcium hydroxide will depend on the particle size range of the iron ores or iron oxide concentrates so that adequate bonding of the iron ore or iron oxide particles is achieved upon carbonation of the pellets. Preferably 3–10 percent by weight of calcium hydroxide should be admixed with the iron ore or iron oxide concentrates.

The moisture content of the mixture should range from 7–20 percent by weight and is in the form of water. The particular quantity of water will vary depending on the particle size distribution of the iron ore and/or iron oxide concentrates. Those skilled in the art may by experimentation determine the quantity of water which is required for optimum agglomeration of the iron ore or iron oxide concentrate particles.

The catalyst is preferably sugar or molasses whose purpose is to accelerate the chemical reaction of the carbonation of the calcium hydroxide and to insure carbonation to about 75 percent or more completion. In some instances it may be desirable to include additives in the admixture. For example, carbon powder may be added to aid the reduction of the iron oxides to metallic iron in subsequent reduction of the iron ores or iron oxide concentrates, or to aid the metallurgical reactions occuring in the steelmaking furnace.

After thorough mixing, the blended materials are then discharged into a conventional balling drum or pelletizer 13 for the formation of pellets. The desirable size for the formation of pellets may vary; however, the desired size is in a range of three-eighths to one-half inches in diameter.

The "green" pellets are then charged into a shaft furnace 15 at its top by means of a double bell arrangement or the like (not shown). The shaft furnace is a vertical, elongated, closed vessel comprising, in FIG. 1, five zones; a drying zone, a carbonation zone, a heating zone, a reducing zone, and a cooling zone. The height of the shaft furnace 15 will, of course, depend upon a variety of factors; each section will need to have a height sufficient to achieve its purpose considering the throughput rates of the pellets.

As the green pellets pass downwardly through the drying zone, warm gases in a temperature range of 100°–200° F flow countercurrently to the downward flow of pellets in the shaft furnace 15 and such warm gases contact the green pellets to initiate evaporation and removal of the moisture content from 7 – 20 percent to about 1 – 7 percent moisture by weight depending on the particle size distribution of the admixture of particles or the surface area of the pellets. The warm gases are the product gases from the reduction zone of the shaft furnace 15 which gases comprise predominately carbon dioxide ($CO_2$) and water vapor ($H_2O$).

As the pellets are being dried in the drying zone of the shaft furnace 15, the carbon dioxide of the warm gases in the drying zone react with the calcium hydroxide ($Ca(OH)_2$) to initiate the carbonation of the pellets as exemplified by the following chemical expression:

EQUATION 1: $Ca(OH)_2 + CO_2 \rightarrow CaCO_3 + H_2O$

As is well known, optimum carbonation occurs when the moisture content of the pellets is in the range of 1 – 7 percent by weight. Thus, it may be necessary to adjust the temperature and humidity of the warm gases in the drying zone. If desired, a first humidity and temperature control means 51 in FIG. 2 may be provided to bring the temperature and the humidity of the gases leaving the carbonation zone to within the above limits by withdrawing such gases from the top of the carbonation zone, adjusting their humidity and temperature, and recirculating these readjusted gases to the bottom of the drying zone of the shaft furnace 15 in FIG. 2.

The pellets then enter the carbonation zone of the shaft furnace 15 in FIG. 2 where hot gases in a temperature range of about 200°–1,300° F. react with the calcium hydroxide in the pellets to continue the carbonation of the pellets, in accordance with Equation 1 above, before all of the moisture in the pellets has been removed by drying. At least a major portion or 50 percent or more, and preferably 75 percent, of the alkaline earth metal oxides or hydroxides should be converted to their corresponding carbonates to provide bonded pellets having sufficient strength. The time for carbonation of the pellets will vary depending on the temperature of the carbon dioxide and the amount of the carbon dioxide available; it is believed that with the hot gases containing from 15–20 percent carbon dioxide by volume, a time of carbonation of 90 minutes is sufficient to produce pellets of sufficient strength and hardness.

A line divides the drying zone and the carbonation zone in the shaft furnace 15 in FIG. 2; however, it will be understood that there is no definite demarcation between these two zones. Carbonation is initiated in the drying zone and proceeds at a faster rate as the moisture content of the pellets is reduced, reaching a maximum rate when about one third to two thirds of the original moisture content in the pellets has been evaporated. Again, it may be necessary to adjust the temperature and humidity of the gases leaving the heating zone to within the above limits, if desired, a second humidity and temperature control means 53 in FIG. 2 may be used by withdrawing such gases from the top of the heating zone, adjusting their temperature and humidity, and recirculating these gases to the bottom of the carbonation zone of the shaft furnace 15 in FIG. 2.

Upon completion of the carbonation of the pellets, they pass through the heating zone and the reducing zone of the shaft furnace 15 in FIG. 2. The pellets are heated and then reduced by hot reducing gases consisting essentially of carbon monoxide (CO) and hydrogen ($H_2$) at elevated temperatures between 1,300° F and 1,800° F, and preferably between 1,300°–1,500° F.

The pellets after their reduction from the metallic oxide state to the metallic state then enter the cooling zone whereby the pellets are cooled by cool gases to ambient temperatures so that the pellets do not reoxidize. Subsequently, the pellets are withdrawn from the shaft furnace as reduced pellets and may then be used in an electrical furnace or the like, as desired.

The associated equipment for the treatment of gases leaving the shaft furnace 15 includes a gas scrubber 17, a pump 19, a gas separator 21, stoves 23a and 23b, and a burner 55.

The gases leaving the shaft furnace 15 at the top thereof predominately comprise carbon dioxide ($CO_2$) and water vapor ($H_2O$). These gases are withdrawn from the shaft furnace 15 through a conduit 29 and enter the gas scrubber 17 wherein these gases are cooled. The withdrawn gases pass through conduits 31 and 33 into the separator 21 by the pump 19 forcing the recirculation of the withdrawn gases. Water is removed from the gases in the separator 21 leaving predominately carbon dioxide ($CO_2$).

The withdrawn gases contain dioxide but their reducing capacity has been substantially improved by the elimination of most of the moisture. The gases then travel through conduits 35 and 37 to the branch connection means 39 which has valves so that the gases may be passed through the stoves 23a and 23b, selectively. (Two stoves are illustrated in FIG. 2, however, additional stoves may be used if desired.) The withdrawn gases are enriched with natural gas, a methane-bearing gas, or other hydrocarbon material, by conduit 25 prior to their entry into the branch connection means 39. The enrichment with the methane-bearing gas is preferably in a stoichiometric proportion to the carbon dioxide content so that the noncatalytic reaction of carbon dioxide and methane is achieved in accordance with the following chemical expression:

EQUATION 2: $CO_2 + CH_4 \rightarrow 2\ CO + 2\ H_2$ when these gases are passed through the heated stove 23a or 23b.

Although the reformation of withdrawn gases with methane ($CH_4$) is preferred, other sources of carbon monoxide (CO) and hydrogen ($H_2$) may be used in accordance with the invention. The stoves 23 a, 23b are of a similar construction to the stoves of a blast furnace as they are refractory lined vessels having brick checker work therein. The function of the stoves 23a, 23b is to heat the recirculated gases comprising carbon dioxide and methane to the proper temperature range for the reformation reaction of Equation 2 to take place as well as to bring the reformed gases to a proper temperature for heating and reducing the pellets. The stoves 23a, 23b are provided with burners 55 that are connected to the stoves by conduits 59 and have suitable stacks 57 to carry off the products of combustion in FIG. 2. The stoves 23a, 23b are heated interiorly by the heat of combustion resulting from the burners 55 after which the burners 55 are shut off, the stack 57 closed, and the enriched gases passed through the stoves by conduit 39 and reacted as previously mentioned. The stoves are preferably heated to a temperature ranging from 2,000° F to about 3,000° F.

The heated enriched gases are collected and leave the stoves 23a, 23b by conduits 41 and 43 and enter the shaft furnace 15 as illustrated in FIG. 2 for the reduction of additional pellets.

Additionally shown is a by-pass line 45 whereby the cooled gases leaving the separator 21 by conduits 35, may be admixed with the preheated gases in conduit 43 prior their entry into the shaft furnace 15 to prevent the achievent of too high of temperatures of the gases entering the shaft furnace 15.

The hot gases leaving the stoves 23a, 23b are introduced into the shaft furnace 15 at the bottom portion of the reducing section as illustrated in FIG. 2. However, a portion of the cooled gases from the separator 21 may enter the bottom of the shaft furnace 15 by conduits 47 and 49 at the lower portion of the cooling zone. These cool gases in conduit 47 may be enriched by natural gas by conduit 27 by the addition of methane prior to entering the shaft furnace 15. These enriched gases from conduit 49 enter the bottom of the cooling zone of the shaft furnace 15 and are heated by the descending pellets. The pellets themselves initiate the reforming reaction of Equation 2 above to produce carbon monoxide and hydrogen. Further, these gases serve the additional function of cooling the pellets to ambient temperatures before their exit from the shaft furnace 15.

In the matter of the carbonation of the pellets as hereinbefore described in Equation 1, the reaction of calcium hydroxide ($Ca(OH)_2$) with carbon dioxide ($CO_2$) occurs at temperatures ranging from 100°F to 1,300°F, as long as the vapor pressure of the carbon dioxide exceeds the vapor pressure of the dissociation vapor pressure of the calcium carbonate. As is well known, carbonation may proceed at a slow rate because of the formation of a thin layer of calcium carbonates on the surface of the manufactured pellet, which hinders the diffusion of carbon dioxide into the interior of the pellets. Consequently large amounts of the calcium hydroxide may not enter into the reaction of Equation 1. It has been found that by the use of catalysts, such as sugar or molasses, faster formation of $CaCO_3$ is obtained which accelerates the conversion of calcium hydroxide to calcium carbonate and insures a more complete reaction. The theory of using sugar, although not well known, is that the sugar dissolves itself into the calcium hydroxide ($Ca(OH)_2$) to form a colloidal intermediate complex which is capable of reacting with the carbon dioxide ($CO_2$) to produce the calcium carbonate ($CaCO_3$) of the reaction. Furthermore, it is believed that the sugar catalyst influences the surface activity of the pellets to accelerate the process of the crystal formation of the calcium carbonate.

To further improve the kinetics of the carbonation it has been found that a moisture content between about one third and two thirds of that required to make pellets is very desirable. Preliminarily, the pellets should be dried partially with hot air or hot gases in the temperature range of 100°– 300°F. The result of this initial drying is the formation of macropores which improve the diffusion of $CO_2$ into the interstices of the pellets. When the moisture content in the pellet is almost as much as that required to make pellets it becomes necessary for the carbon dioxide to first become dissolved in the water surrounding each individual particle of the pellet and then to consequently react with the calcium hydroxide. As is well known, the carbonation of the calcium hydroxide at lower temperatures almost ceases in the absence of moisture. Thus, the preferred mode of the invention is to achieve the drying and carbonation simultaneously thereby producing a carbonated bonded pellet at a much faster rate than would be normally expected.

The bond of the calcium carbonate in the pellet provides a crush resistant strength from 30 to 300 pounds with the maintenance of this strength up to approximately 1,500°F, the temperature at which the thermal disassociation of the calcium carbonate begins to accelerate in accordance with the chemical equation:

EQUATION 3: $CaCO_3 \xrightarrow{heat} CaO + CO_2$

It is desirable therefore to maintain at least in the upper portions of the reduction zone, the reduction temperature at a temperature not in excess of approximately 1,500°F. However, in situations where the pellets are heated above 1,500°F it is believed that a series of successive reduction reactions proceed which are accompanied by a formation of metallic bonds which replace the carbonated bond. This new iron bond in lieu of the carbonate bond is more likely to occur in that, finely ground iron oxide concentrates have a very large total surface area which causes an intensified process of reduction and bonding.

It should be noted, however, that the sintering of granular concentrates deprives the concentrate of its basic advantage, that is a pellet having a high surface area. By using the carbonate bonding process as outlined above, at temperatures under 1,500°F., an advantage is obtained over sintering which is maintaining the finely ground particles of the pellets in isolation from one another to accelerate the reduction of the iron oxide concentrates.

Figure 3:
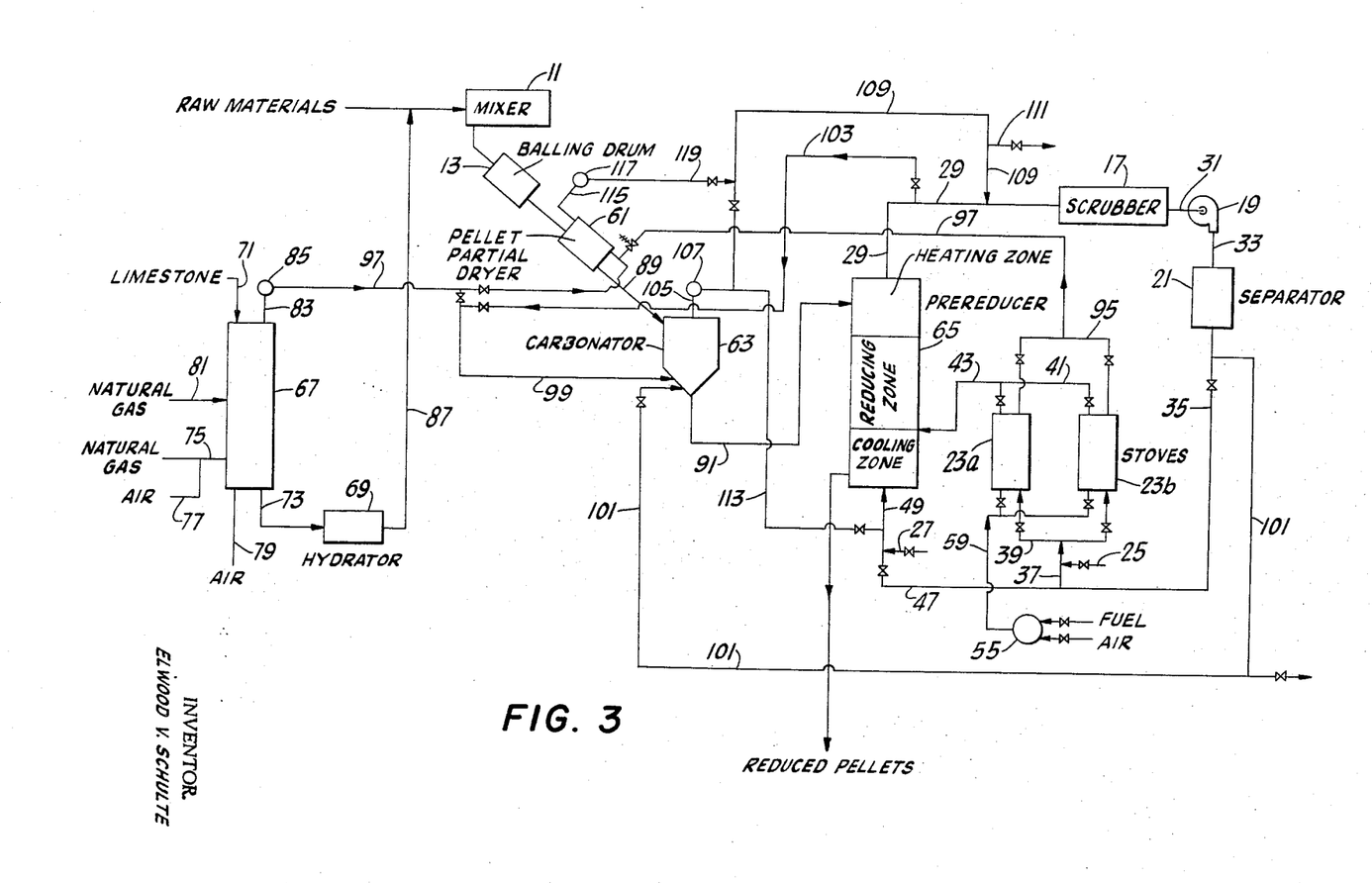
FIG. 3 illustrates another embodiment of a system for producing pellets of iron from finely divided iron oxides according to the methods of FIG. 1; and,
FIG. 4 illustrates an embodiment of a system for producing steel from finely divided iron ores and/or iron oxide concentrates.

In FIG. 3 another second embodiment of a system for producing pellets of metal comprises a mixer 11, a balling drum or pelletizer 13, a pellet dryer 61, a carbonator 63, a prereducer 65, and a hydrator 69.

In FIGS. 1 and 3 raw materials including iron oxide concentrates, or iron ores, sugar, calcium hydroxide and 7–20 percent moisture in the form of water are added to the mixer 11. The calcium hydroxide ($Ca(OH)_2$) is added with the iron ore or iron oxide concentrates prior to their entry into the mixer 11. To produce hydrated lime or calcium hydroxide, raw limestone ($CaCO_3$) is charged into the lime kiln or limestone calcinator 67 at 71 and flows downwardly to exit the calcinator 67 as calcined lime (CaO) at 73. The chemical reaction proceeds in accordance with the well known reaction of Equation 3 above. A fuel, such as a natural gas, is added through a distributor at 75 where the gas is mixed with air from lines 77 or 79. The burning of the fuel heats the limestone ($CaCO_3$). Additional natural gas or other fuel may be added at 81 near the midpoint of the calcinator 67 to consume the remainder of the air that may have been added at line 77 and/or line 79. Consequently, the limestone ($CaCO_3$) is heated to its calcinating temperature, in excess of 1,600°F. to form calcium oxide or burnt lime (CaO) in accordance with Equation 3. The gas products from the calcinator 67 pass upwardly therethrough where they are cooled while preheating the cold limestone. These gases comprise predominately carbon dioxide ($CO_2$) and nitrogen ($N_2$). The carbon dioxide-containing gas escapes through lines 83 by means of a fan 85 at temperatures of 250°–1,000°F.

The calcinated lime (CaO) is then passed into hydrator 69 and hydrated according to the following reaction:

EQUATION 4: $CaO + H_2O \rightarrow Ca(OH)_2$

The calcium hydroxide ($Ca(OH)_2$) is then fed by a conveyor or the like 87 to the stream of raw materials flowing into mixer 11.

After an intimate mixture of the ingredients is achieved in the mixer 11, the materials pass to a balling drum or a pelletizer 13 where pellets of a desirable size (preferably three-eighths inch, one-half inch in diameter) are formed. The pellets then enter the partial pellet dryer 61 where the moisture content is reduced from 7 – 20 percent to about 1 – 7 percent which has been found to be the optimum moisture content for the most rapid reaction of carbon dioxide ($CO_2$) with the calcium hydroxide ($Ca(OH)_2$) in the pellet to form a carbonate bond of the particles. In the pellet partial dryer 61, the carbonation of the calcium hydroxide ($Ca(OH)_2$) is initiated, but not completed, in accordance with Equation 1 above.

The partially dried and partially carbonated pellets are then added to the carbonator 63 by means of a conveyor or the like 89. The pellets are exposed to a carbon dioxide gas for a period of between ten minutes to two hours at or above atmospheric temperatures to convert more than 75 percent of the calcium hydroxide contained in the pellet to calcium carbonate thereby rearranging the calcium microstructure within the pellet to form a hard pellet. It will be understood that drying and carbonating occur concurrently in the pellet dryer 61 and in the carbonator 63 in which the carbonation is completed. These pellets have a crushing strength of about 30 to 300 pounds as they are discharged from the carbonator 63 to the top of the shaft furnace or prereducer 65 by a conveyor means 91.

The prereducer or shaft furnace 65 is a vertical, elongated closed vessel and has three distinct zones in FIG. 3 including an upper heating zone, an intermediate reducing zone, and a lower cooling zone.

Partially carbonating the pellets in dryer 61 is necessary when the strength of the "green" pellets would be so insufficient that the pellets would fall apart upon being discharged into the carbonator 63. Likewise, completing a major portion of the carbonation of pellets in the carbonator 63 is necessary when the strength of the pellets would be so insufficient that they would fall apart upon being discharged into the prereducer or shaft furnace 65 or become crushed due to pressure from other pellets in the heating zone of shaft furnace 65. It thus may be desirable where the strength requirements of the pellets are not so great to modify the embodiment of the present invention shown in FIG. 3 by providing only the dryer 61 and eliminating the carbonatore 63. The prereducer 65 would then have an additional zone, a carbonation zone, for completing the carbonation that was initiated in the dryer 61.

The pellets enter the prereducer 65 where they travel downwardly to become heated and reduced by their contact with a reducing gas containing preferably carbon monoxide and hydrogen. The pellets first pass through the heating and reducing zone where hot gases containing carbon monoxide and hydrogen pass upwardly through the carbonated bonded pellets at a temperature between 1,300°F and 1,800°F, but preferably... 1,300°F to 1,500°F, to reduce the iron oxide in the pellets to metallic iron without melting of the iron. Ideally, the reduction occurs in the temperature range of 1,300°F to 1,500°F to reduce the iron oxide to metallic iron without losing the calcium carbonate bond. However, at temperatures at excess of 1,500°F the decomposition of the carbonate bond begins to take place at an accelerated rate by driving off carbon dioxide from the calcium carbonate. But, a new bond is created by the solid state metallization of the iron oxides in the pellet to replace the carbonate bond. The pellets then are cooled in the cooling zone to ambient temperatures and are withdrawn from the prereducer 65 for subsequent use in an electric furnace or the like.

The associated equipment for the treatment of gases leaving the prereducer 65 in FIG. 3 is very similar to the equipment of FIG. 2 and includes a gas scrubber 17, a pump 19, a gas separator 21, stoves 23a and 23b, and a burner 55.

The gases leave the prereducer 65 by conduit 29, enter the scrubber 17, and exit the scrubber 17 by conduit 31. The withdrawn gases pass into the separator 21 by conduit 33 wherein water is removed from the gases in the separator 21. The principal gas is carbon dioxide which exits the separator 21 by conduit 35 and enters the stoves 23a and 23b by conduits 37 and 39. The withdrawn gases are enriched with natural gas or other hydrocarbon materials by conduit 25 so that the gases are reformed into carbon monoxide (CO) and hydrogen ($H_2$) when they are in the stoves 23a or 23b, for example, in accordance with Equation 2 above.

The reducing gases of carbon monoxide and hydrogen are heated by the brickwork in the stoves 23a and 23b. The stoves are heated by the products of combustion created by burning a gas or fuel with air in burner 55 to a temperature of 2,000°F - 3,000°F. Almost complete combustion is obtained at burner 55 so the products of combustion which enter the stoves by conduit 59, contain practically no carbon monoxide nor hydrogen. The gases heating the stoves 23a or 23b may then pass by conduits 95 and 97 to the partial pellet dryer 61, if desired, to heat and initiate the carbonation of pellets therein.

When the stoves reach or exceed a temperature of 2,500°F the heating cycle is discontinued and natural gas or other hydrocarbons and recycled carbon dioxide ($CO_2$) are allowed to pass through stoves 23a and 23b, as selected, by conduits 37 and 39 where the gases are reformed according to Equation 2 above. The reformed gases of carbon monoxide (CO) and hydrogen ($H_2$) enter the prereducer 65 at its midpoint by conduits 41 and 43.

Additionally shown is a by-pass line whereby the cooled gases leaving the separator 21 by conduit 35 may enter the prereducer 65 at is bottom by way of line 49 for cooling of the pellets therein. These gases may additionally be enriched with natural gas at 27 prior to their entry into the cooling zone of the prereducer 65. These gases are then heated by the descending pellets; the pellets themselves initiating the reformation reaction to produce carbon monoxide and hydrogen as earlier explained. Additionally, these gases cool the pellets before their exit from the prereducer 65.

As earlier indicated the carbonator 63 uses carbon dioxide gases to carbonate the pellets entering the carbonator. Several sources of carbon dioxide gases are available in the embodiment of FIG. 3, for example, the carbon dioxide produced in the calcinator 67 may be channeled through conduits 83, 97, 99 to the bottom of the carbonator 63. Further, the withdrawn gases leaving the separator 21 may be circulated to the carbonator by the conduit 101 and connected with the bottom of the carbonator 63 or the withdrawn gases leaving the prereducer 65 may follow conduit 103 into conduit 99 to be used in the carbonator 63.

As a result of the carbonation in the carbonator 63, the exiting gases will contain primarily water vapor and amounts of carbon dioxide which have not entered into the reaction of carbonating the calcium hydroxide. Thus, conduit 105 connected to the top of the carbonator 63 removes and withdraws these gases from the carbonator 63 by means of a blower 107. From the blower 107 the gases follow a conduit 109 and may either enter the conduit 29 leading to the gas scrubber 17 or be expelled into the atmosphere at conduit 111. Additionally, the gases leaving the carbonator may also follow conduit 113 which also leads into conduit 49 to be channeled back into the prereducer 65. Similarily, excess carbon dioxide will exit from the partial pellet dryer 61 at conduit 115 and withdrawn by means of a blower 117 and channeled by conduit 119 into conduit 109 to be expelled into the atmosphere at 111 or recirculated with the withdrawn gases into conduit 29.

Figure 4:
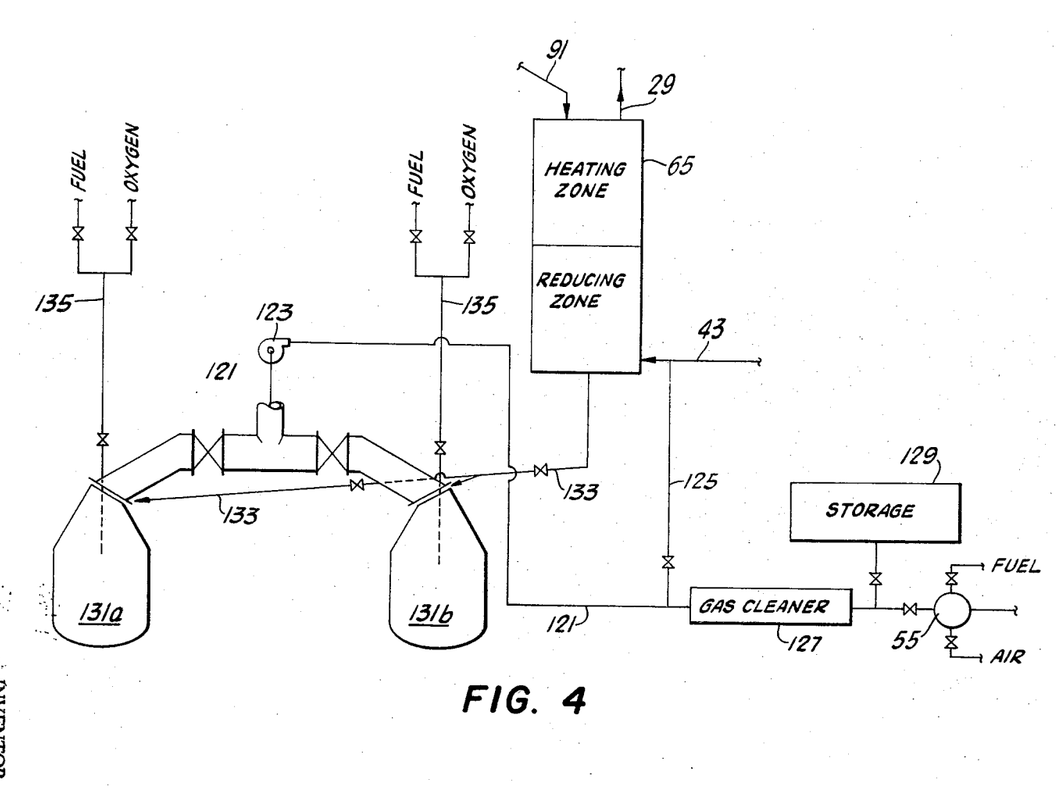

In FIG. 4, a third embodiment of an integrated system for producing steel from finely divided iron ores and/or iron oxide concentrates comprises the same equipment as shown in FIG. 3 and additionally includes basic oxygen furnaces 131a and 131b and their associated gas collecting equipment.

The methods of operating the equipment of the system in FIG. 4 are similar to those in the second embodiment of the invention of FIG. 3, except for the following differences.

The prereducer 65 is a vertical, elongated closed shaft furnace and has two zones comprising a heating zone and a reducing zone. The pellets enter the prereducer 65 and travel downwardly to become heated and reduced by their contact with reducing gases that contain preferably carbon monoxide and hydrogen. After the pellets have been reduced, they are immediately transferred to the basic oxygen steelmaking vessels 131a and 131b for further use in the manufacture of steel. The hot pellets must be protected from contact with the atmosphere as they pass along a conveyor 133 to the vessels 131a or 131b to prevent their reoxidation. The iron pellets are charged into the vessel 131a or 131b along with scrap, molten metal, alloy additions such as, for example, chromium, aluminum, silicon, and other additives as desired. These constituents are melted for the manufacture of steel in a conventional manner for basic oxygen steelmaking furnaces with oxygen and/or fuel being added by lines 135. It may be necessary to add carbon to the basic oxygen furnace to provide additional fuel for the pellet melting process and to reduce any last traces of iron oxide in the pellets entering the furnace (131a or 131b) from the prereducer 65. Or, as previously mentioned the pellets may contain carbon powder that was added to the pellets in the admixing step. The calcium carbonate contained within the pellets melts, decomposes to lime (CaO), and reacts with various impurities of the molten bath in the vessel 131a or 131b, such as, for example, silica and the like, to slag off these impurities during the melting and blowing cycle of the basic oxygen furnace. Because the pellets have calcium carbonate contained therein, the fluxing of impurities is much more efficient than heretofore experienced with lump additions of lime and other fluxing agents to a steelmaking furnace.

During the oxygen blow of the basic oxygen furnace 131a or 131b, carbon monoxide is generated by the reaction of the oxygen with the carbon in the metal. The carbon monoxide generated by this combustion is conveyed directly by conduits 121, and 125 by a fan 123 or the like to conduit 43 and used directly to reduce the pellets within the prereducer 65. The carbon monoxide gas may be passed into a gas cleaner 127 and used with burner 55 after these gases have been cooled or stored in a gas storage area 129.

Thus, in this embodiment of the invention, a basic oxygen vessel may be generating carbon monoxide while being blown to make steel so that this product gas may be used to prereduce pellets in the prereducer 65. Further, as one basic oxygen furnace, such as, for example, 131a is being blown to produce steel, the other basic oxygen furnace 131b may be emptied of finished molten steel from a previous blow and recharged with prereduced pellets, molten metal, scrap, alloys, fluxes and the like. Thus, there is practically always a continuous operation of a vessel and a continuous generation of carbon monoxide to be used in the prereducer 65 or the burner 55.

The third embodiment of FIG. 4 has been illustrated with basic oxygen furnaces, however, this third embodiment may be practiced with other steelmaking furnaces such as an electric furnace.

Charging hot, reduced pellets from the prereducer 65 in FIG. 4 directly and immediately into a steelmaking furnace thus provides an integrated system for making steel from finely divided iron oxide materials. Hence, raw iron ores, such as, for example, the taconites, may be shipped directly to a conventional steelmaking facility which has the equipment described above. These raw iron ores either as received or after benefication to a higher iron oxide content are then treated in accordance with the invention whereby steel is produced.

By combining the steps of hardening pellets of finely divided iron oxide materials with carbon dioxide, of reducing pellets with carbon monoxide, and of making steel from these pellets a system is provided which is capable of using and reusing the gases evolved from each one of these steps to support the process of other steps. Thus, the gases evolved during carbonation support reduction. The gases evolved in reduction support carbonation. The gases evolved in steelmaking support reduction. The gases evolved in calcinating lime support carbonation.

While the present invention has been described in respect of iron oxide materials the invention may be used with other metallic substances with minor modifications, such as, for example, nickel compounds, copper compounds, and the like.

What is claimed is:

1. A process for making steel from finely divided iron oxide materials comprising the steps of:
   a. admixing said finely divided iron oxide materials with alkaline earth metal oxides or hydroxides in the presence of about 7 to 20 percent by weight moisture in which said alkaline earth metal oxides or hydroxides are present in an amount sufficient for bonding said finely divided iron oxide materials upon subsequent carbonation;
   b. forming pellets of said admixture and, then, passing said pellets directly into a shaft furnace;
   c. contacting said pellets with carbon dioxide in a carbonating zone of said shaft furnace to convert at least a major portion of said alkaline earth metal oxides or hydroxides to their corresponding carbonates; then,
   d. reducing said finely divided iron oxide materials in said pellets to iron in a reducing zone of said shaft furnace at a temperature of at least 1,300°F wherein carbon dioxide is generated in said reducing zone; said carbon dioxide constituting substantially the entire source of carbon dioxide that is used in step (c); and
   e. immediately charging said hot reduced pellets with conventional alloying elements into a conventional steelmaking furnace where said furnace is operated conventionally to produce steel.

2. The process of claim 1 in which at least 75 percent by weight of said alkaline earth metal oxides or hydroxides are converted to their corresponding carbonates.

3. The process of claim 1 wherein the reducing of said finely divided iron oxide materials is achieved with a gaseous admixture of carbon monoxide and hydrogen that has been heated to a temperature of at least 1,300°F.; said gaseous admixture being converted to an admixture of carbon dioxide and water vapors upon the reduction of said finely divided iron oxide materials; and, said carbon dioxide and water vapors passing into said carbonating zone to carbonate said pellets.

4. A process for making steel from finely divided iron oxide materials comprising the steps of:
   a. admixing said finely divided iron oxide materials with alkaline earth metal oxides or hydroxides in the presence of about 7 to 20 percent by weight moisture in which said alkaline earth metal oxides or hydroxides are present in an amount sufficient for bonding said finely divided iron oxide materials upon subsequent carbonation;
   b. forming pellets of said admixture and, then, passing said pellets directly into a shaft furnace;
   c. contacting said pellets with carbon dioxide in a carbonating zone of said shaft furnace to convert at least a major portion of said alkaline earth metal oxides or hydroxides to their corresponding carbonates;
   d. reducing said finely divided iron oxide materials in said pellets to iron in a reducing zone of said shaft furnace with a gaseous admixture of carbon monoxide and hydrogen whereby the reduction by-product gases resulting from reduction are carbon dioxide and water vapor;
   e. immediately charging said hot reduced pellets with conventional alloying elements and molten metal into a conventional basic oxygen steelmaking furnace where said furnace is operated conventionally to produce molten steel and furnace by-product waste gases;
   f. passing said reduction by-product gases of carbon dioxide and water vapor into said carbonating zone of said shaft furnace; said carbon dioxide constituting substantially the entire source of carbon dioxide that is used in step (c);
   g. withdrawing said waste gases from said steelmaking furnace;
   h. recirculating a portion of said waste gases to said reducing zone of said shaft furnace; and
   i. burning a portion of said waste gases to produce heat for bringing said carbon monoxide and hydrogen to a temperature of at least 1,300°F.

5. A process for producing pellets of iron from finely divided iron oxide materials comprising the steps of:
   a. admixing said finely divided iron oxide materials with an alkaline earth metal oxide or alkaline earth metal hydroxide in the presence of moisture in an amount sufficient for bonding said finely divided iron oxide materials together upon subsequent carbonation;
   b. forming pellets of said admixture and, then, passing said pellets directly into a shaft furnace;
   c. carbonating by contacting said pellets with carbon dioxide in a carbonating zone of said shaft furnace to convert at least a major portion of said alkaline earth metal oxides or hydroxides to their corresponding carbonates;
   d. reducing said finely divided iron oxide materials in said pellets to their iron in a reducing zone of said shaft furnace with carbon monoxide at a temperature of less than 1,500°F, thereby providing substantially unsintered, reduced pellets and reduction by-product gases of carbon dioxide and water vapor; and
   e. passing said reduction by-product gases of carbon dioxide and water vapor to said carbonating zone of said shaft furnace; said carbon dioxide constituting substantially the entire source of carbon dioxide that is used in step (c).

6. The process of claim 5 including the steps of partially drying and initiating the carbonating of said pellets in a drying zone of said shaft furnace and completing the drying and the carbonating of said pellets in said carbonating zone of said shaft furnace.

7. The process of claim 5 wherein said carbonating of said pellets is carried out along with a simultaneous drying of said pellets.

8. The process of claim 5 including the step of cooling the reduced pellets to ambient temperatures in a cooling zone of said shaft furnace.

9. The process of claim 5 wherein calcium hydroxide is admixed with said finely divided iron oxide material and including the steps of:
 a. calcining limestone to produce lime in a calcinator whereby carbon dioxide is evolved;
 b. hydrating said lime to produce calcium hydroxide;
 c. using said calcium hydroxide according to step a) of claim 5;
 d. withdrawing said carbon dioxide from said calcinator and introducing said carbon dioxide into said carbonating zone of said shaft furnace.

10. A process of producing metallized pellets from finely divided iron oxide materials comprising the steps of:
 a. admixing said finely divided iron oxide materials with alkaline earth metal oxides or hydroxides in the presence of about 7 to 20 percent by weight moisture in which said alkaline earth metal oxides or hydroxides are present in an amount sufficient for bonding said finely divided iron oxide materials upon subsequent carbonations;
 b. forming pellets of said admixture and, then, passing said pellets directly into a shaft furnace;
 c. partially drying said pellets in a drying zone of said shaft furnace to reduce the moisture sufficiently to enhance the subsequent carbonation of the alkaline earth metal oxides or hydroxides contained therein;
 d. initiating carbonation in a carbonating zone of said shaft furnace at least by the time one third of the moisture is removed from said pellets; and
 e. completing at least 75 percent of the carbonation of the alkaline earth metal oxides or hydroxides in said pellets before all of the moisture is removed from said pellets; and
 f. heating and reducing the iron oxide materials in the pellets with carbon monoxide and hydrogen in a reducing zone of said shaft furnace wherein carbon dioxide is generated; said carbon dioxide constituting substantially the entire source of carbon dioxide that is used in step (d).

* * * * *